F. H. LIPPINCOTT.
PENCIL.
APPLICATION FILED APR. 22, 1919.
1,324,971.
Patented Dec. 16, 1919.
3 SHEETS—SHEET 1.
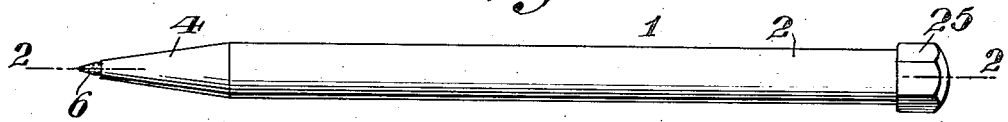
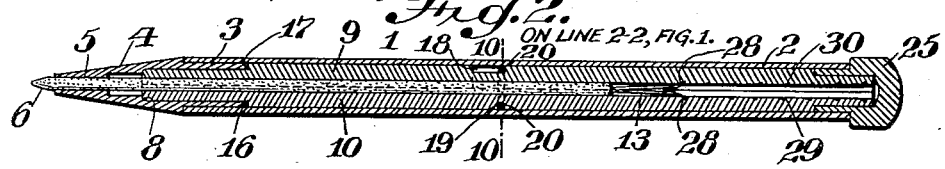
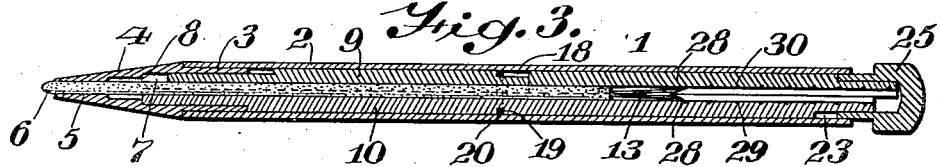
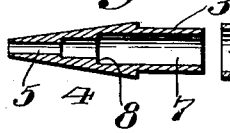
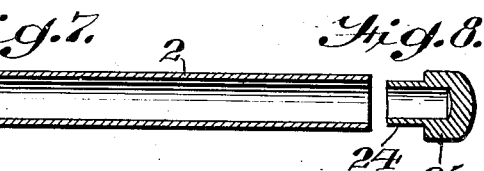
INVENTOR
Fisher H Lippincott.
BY
ATTORNEYS.

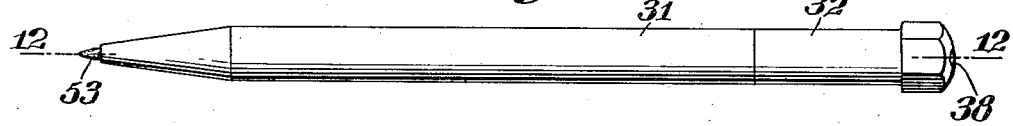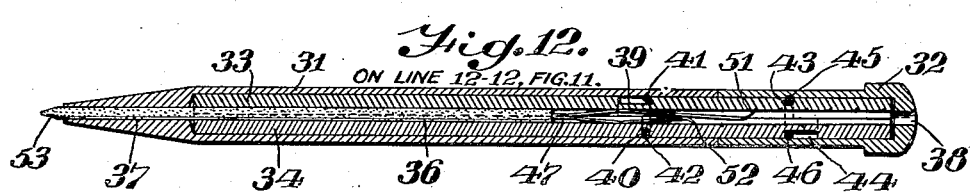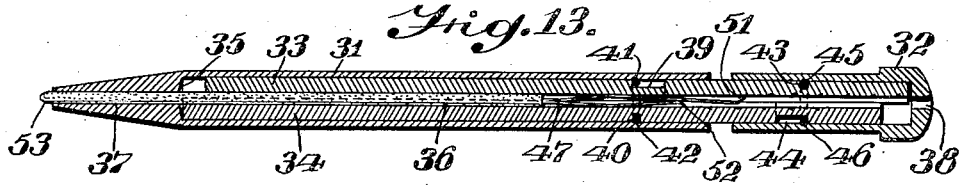

F. H. LIPPINCOTT.
PENCIL.
APPLICATION FILED APR. 22, 1919.
1,324,971. Patented Dec. 16, 1919.
3 SHEETS—SHEET 3.
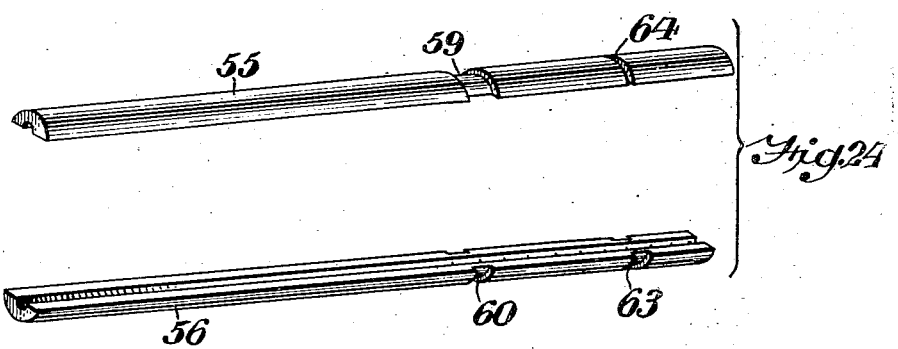
INVENTOR
Fisher H. Lippincott
BY
Hedersheim Fairbanks
ATTORNEYS.

UNITED STATES PATENT OFFICE.

FISHER H. LIPPINCOTT, OF PHILADELPHIA, PENNSYLVANIA.

PENCIL.

1,324,971. Specification of Letters Patent. Patented Dec. 16, 1919.

Application filed April 22, 1919. Serial No. 291,923.

*To all whom it may concern:*

Be it known that I, FISHER H. LIPPINCOTT, a citizen of the United States, residing in the city and county of Philadelphia, State of Pennsylvania, have invented a new and useful Pencil, of which the following is a specification.

My present invention comprehends a novel construction of a pencil wherein novel means are employed to feed the lead or other insert.

It further comprehends a novel construction of a pencil in which one or more of the filler sections which form the longitudinal bore to receive the insert has limited longitudinal movement relatively to the surrounding sheath, and a movable section is provided which is controlled by a cap or sheath member to actuate a follower to effect the feed of the insert.

It further comprehends a novel pencil in which a worn out insert can be readily replaced by a new one without taking the pencil apart.

It further comprehends a novel construction and arrangement of a pencil, wherein the sheath, end cap, filler sections and follower are constructed and arranged in a novel manner and assembled in a novel manner with respect to the sheath which forms the grasping portion of the pencil.

Other novel features of construction and advantage will be hereinafter more clearly set forth.

For the purpose of illustrating my invention, I have shown in the accompanying drawings certain forms thereof which are at present preferred by me, since they will give in practice satisfactory and reliable results. It is to be understood, however, that these embodiments are typical only, and that the various instrumentalities of which my invention consists can be variously arranged and organized, and that my invention is not limited to the precise arrangement and organization of these instrumentalities as herein set forth.

Figure 1 represents a plan view of a lead pencil embodying my invention.

Fig. 2 represents a section on line 2—2 of Fig. 1.

Fig. 3 represents a section similar to that shown in Fig. 2, but showing certain of the parts in a different relation from that seen in Fig. 2.

Fig. 4 represents in perspective one section of the filler.

Fig. 5 represents in perspective the other section of the filler.

Fig. 6 represents, in section and in detached position, the front end of the casing or sheath.

Fig. 7 represents, in section and in detached position, the body or grasping portion of the sheath.

Fig. 8 represents, in section and in detached position, the end or cap portion of the sheath.

Fig. 9 represents, in perspective and in detached position, the follower.

Fig. 10 represents a section on line 10—10 Fig. 2.

Fig. 11 represents a plan view of another embodiment of my invention.

Fig. 12 represents a section on line 12—12 of Fig. 11.

Fig. 13 represents a section similar to Fig. 12, but showing certain of the parts in a different relation from that seen in Fig. 12.

Fig. 14 represents, in perspective and in detached position, a section of the filler seen in Figs. 12 and 13.

Fig. 15 represents, in perspective and in detached position, the other section of the filler seen in Figs. 12 and 13.

Fig. 16 represents, in perspective, the follower seen in Figs. 12 and 13.

Fig. 17 represents, in section and in detached position, the body or grasping portion of the sheath seen in Fig. 11.

Fig. 18 represents, in section and in detached position, the end or cap portion of the sheath.

Fig. 19 represents a plan view of a locking member.

Fig. 20 represents a plan view of another embodiment of my invention.

Fig. 21 represents a section on line 21—21 of Fig. 20.

Fig. 22 represents a section similar to Fig. 21, but showing certain of the parts in a different relation from that seen in Fig. 21.

Fig. 23 represents a section similar to Fig. 21, but showing certain of the parts in a different relation from that seen in Figs. 21 and 22.

Fig. 24 represents, in perspective, the sections of the filler seen in Figs. 21, 22 and 23.

Fig. 25 represents, in cross section, another embodiment of my invention, wherein the bore formed by the filler sections is oblong.

Similar numerals of reference indicate corresponding parts.

Referring to the drawings—

I will first describe the construction and operation of the embodiment seen in Figs. 1 to 10 inclusive.

1 designates a lead pencil embodying my invention. The outer sheath or casing of the pencil is made in sections. The body or grasping portion is formed by a tubular sheath 2 which receives at its forward end the reduced end 3 of a tubular section 4, which is secured to the grasping portion 2 in any desired manner, for example, by adhesive or by having a driving fit. The section 4 has an aperture 5 which is contracted at its forward end to serve as a guide and support for the lead or insert 6, and at its rear end, the aperture is of enlarged diameter as at 7, and is provided with a shoulder 8.

9 and 10 represent, respectively, the filler sections which are semi-cylindrical in contour. The inner faces of the filler sections are grooved as at 11 and 12 respectively, so that when the sections are in assembled position in the sheath, a longitudinal bore is provided to form a guide and support for the lead 6 and to receive a follower 13, which effects the advance of the lead when desired. The filler section 10 is fixed with respect to the inner wall of the sheath in any desired manner, and at its forward end, it is cut away as at 14, to adapt it to enter the aperture 7 and abut against the shoulder 8 of the sheath section 4. The section 9 is slidable within the sheath and has its front portion cut away at its periphery, as at 15, to adapt it to enter the aperture 7 and abut against the shoulder 8. The cut away portions 14 and 15 form respectively the shoulders 16 and 17.

In order to limit the relative movement permitted between the filler sections, the section 9 is provided at its periphery with a circular groove 18, and the section 10 is provided with a circular groove 19. One of these grooves is wider than the other, and as illustrated, the groove 18 is wider than the groove 19. A clip 20 which consists of a split ring is seated in the grooves 18 and 19. The rear end portions of the filler sections are cut away at their periphery, as at 21 and 22, to form with the inner wall of the sheath an annular chamber 23 into which telescopes the tubular extension 24 of an end cap or sheath section 25. The rear end of the filler section 9 is fixed to the end cap 25 in any desired manner, for example, by adhesive, but the filler section 10 is not connected with such end cap, so that when the end cap 25 is moved relatively to the sheath portion 2, the filler section 9 moves in unison with it, and the filler section 10 remains stationary. The follower 13 is preferably constructed of a strip of spring metal which is bent upon itself to form a forward end 26 to contact against the rear end of the lead 6, and with spring arms 27, which at their free ends are outwardly deflected to form the prongs or cutting members 28.

Assuming now that the parts are in assembled position and the filler sections are in the position seen in Fig. 2, the operator holds the sheath 2 in one hand and grasps the end cap 25 and draws it rearwardly, so that the filler section 9 slides over the prong 28 with which it coöperates. The other opposite prong is seated in the notch 29 and prevents rearward movement of the follower. When the end cap is now moved forwardly relatively to the sheath section 2, the juxtaposed prong 28 bites into the wall of the groove 11 forming a notch 30 and the section 9, the follower 13 and the lead 6 move forwardly in unison to cause the lead to extend a desired distance from the front end of the pencil.

If a pencil is desired in which the lead is refillable without taking the pencil apart, I employ the embodiment seen in Figs. 11 to 19 inclusive, to which attention is now directed.

In this embodiment, the sheath consists of a tubular section 31 and a tubular cap 32 which receives the filler sections 33 and 34 respectively which abut against the shoulder 35 and are grooved to form when assembled a longitudinal bore 36 which is in alinement with the lead receiving aperture 37 in the sheath 31 and the aperture 38 in the end cap 32. The filler section 33 has a groove 39 which is wider than a groove 40 in the section 34 and these grooves receive a split ring 41 which is seated in an annular recess 42 in the inner wall of the sheath 31, and this retains the filler section 34 in fixed relation to the sheath 31 to prevent their relative longitudinal movement. The cap 32 instead of being fixed to the movable filler section, as in Fig. 1, is slidable on it. The movable section 33 is provided with a groove 43 which is narrower than a groove 44 in the fixed section 34, and these grooves receive a split ring 45 which is seated in a recess 46 in the end cap 32. The follower 47 consists of a strip of spring metal bent upon itself to form a lead contacting end 48, and the bowed spring arms 49 and 50, one of which is longer than the other, the arm 49 being the longer and having its free end bent outwardly to form a prong 51, while the arm 50 bears against the arm 49 and is outwardly deflected to form a prong 52.

The lead 53 is first inserted into the pencil through the opening 38 and the follower 47 is then inserted through such opening 38, the lead and follower being received in the longitudinal aperture formed by the grooved filler sections. When the end cap is moved rearwardly relatively to the sheath, the movable filler section will slide over the prong 51 and the prong 52 of the follower will bite into the section 34. The end cap is now moved forwardly and the prong 51 will bite into the movable section 33 and move with it together with the follower so that the lead will be moved forwardly in the sheath, as is evident.

It is desirable in some cases to have a pencil of the type herein disclosed, in which the point of the lead can be moved back into the sheath when the pencil is not to be used, and thus prevent the point of the lead from becoming broken. I have shown a pencil having this feature in the embodiment shown in Figs. 20–24, inclusive, to which figures attention is now directed. In this embodiment, I employ a sheath 53 and an end cap 54. The filler members 55 and 56 are both relatively movable with respect to the sheath 53, as they are each provided with a peripheral groove to receive a split ring 57 narrower than each groove and seated in a recess 58 in the sheath. The groove 59 in the filler section 55 is wider than the groove 60 in the filler section 56. The forward end of the groove 59 is in advance of the forward end of the groove 60. The end cap 54 is slidable on the filler section 56 and has a recess 61 in which is seated a split ring 62 which is in a groove 63 in the filler section 56 and a groove 64 in the section 55, the groove 63 having a desired width to provide for limited relative movement of the filler sections. The follower 65 is similar to that seen in Fig. 2, and contacts against the lead 66. When the parts are in the position seen in Fig. 21, the point of the lead when pressed against a fixed surface, will move into the sheath, since the prongs of the follower bite into the filler sections and the filler sections and follower will move into the position seen in Fig. 22. The forward movement of the end cap relatively to the sheath will move the parts from the position seen in Fig. 21 into that seen in Fig. 22. When it is desired to advance the lead after the point is worn down, the end cap is moved rearwardly and as this is fixed to the filler section 55, such section will slide rearwardly over the coöperating prong of the follower, the rearward movement of the follower being prevented by its opposed prong biting into the other filler section. When the end cap is now pushed forwardly the filler section 55, the follower and the lead will be advanced and a new point of lead presented for use.

In all of the embodiments of my invention herein shown, I provide a movable filler section to effect the advance of the lead.

It will be seen from Fig. 25 that the longitudinal bore in the filler section is shown as oblong instead of round so as to position the prongs of the follower, and in practice the grooves in the filler sections would be constructed in all the embodiments of my invention so as to form an oblong bore, in cross section.

In so far as I am aware, I am the first in the art to construct a pencil wherein the bore is formed by filler sections which coöperate with a follower in such a manner that one section prevents rearward movement of the follower while the other section effects the advance feed of the follower, or one wherein a fixed and a movable filler section contributes with a sheath to form an insert receiving, longitudinal bore in which is located means controlled by one of the sections to effect the advance feed of the insert and I therefore desire the claims to such features to receive the interpretation to which a pioneer invention is entitled.

When an end cap and follower is employed of the construction seen in Figs. 11, 12 and 13, it will be understood that, after an insert is worn out, the follower is fed forwardly into such position that it can be removed from the front end of the bore. A new insert is then inserted into the bore through the aperture in the end cap, and the follower is then inserted through the end cap, and the movement of the end cap will then move the movable filler sections to effect the advance feed of the follower and thereby of the insert.

It is to be understood that in accordance with my present invention the end cap or sheath proper is connected with the movable filler section in any desired manner so that in the embodiments seen in Figs. 1 to 3 inclusive and Figs. 20 to 23 inclusive a new insert can be readily placed in the bore of the filler section by removing the end cap and the follower and then inserting the insert into the bore formed by the filler section after which the follower is inserted and the end cap is connected to the movable filler section in any desired or conventional manner.

It will now be apparent that I have devised a novel and useful construction of a pencil which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:

1. In a pencil, in combination, a sheath, a fixed and a movable filler section within said sheath and contributing with it to form an insert receiving, longitudinal bore, an end member connected to said movable filler section to move it, and means controlled by the movement of said movable filler section to effect the feed of the insert.

2. In a pencil, in combination, a sheath, a fixed and a movable filler section within said sheath and contributing with it to form an insert receiving, longitudinal bore, an end member connected to said movable filler section to move it, means controlled by the movement of said movable filler section to effect the feed of the insert, and means to limit the relative movement between said movable filler section and said sheath.

3. In a pencil, in combination, a sheath, filler sections within the sheath and contributing with it to form a longitudinal bore to receive an insert, a follower in said bore having spring controlled prongs to engage said sections, and an end cap connected to one filler section to effect the feed of said follower and thereby of said insert.

4. In a pencil, in combination, a sheath, a fixed and a movable filler section in the sheath and contributing with it to form an insert receiving, longitudinal bore, a follower in said bore having spring controlled prongs to engage said filler sections, and an end cap connected to said movable filler section to effect the feed of said follower.

5. In a pencil, in combination, a sheath, a fixed and a movable filler section in said sheath and contributing with it to form an insert receiving, longitudinal bore, a follower in said bore having spring controlled prongs engaging said filler sections, an end cap connected to said movable filler section to effect the feed of said follower, said filler sections each having a peripheral groove, the groove in one section being wider than the groove in the other section, and means seated in said groove to limit the relative movement permitted between said filler sections.

6. In a pencil, in combination, a sheath, filler sections in said sheath and contributing with it to form an insert receiving, longitudinal bore, a follower in said bore having spring controlled prongs to engage said filler sections, and an end cap connected to one of said sections to effect the feed of said follower, said cap having an aperture in alinement with said bore to permit the insertion into the bore of a new insert and to permit the reinsertion of said follower.

7. In a pencil, in combination, a sheath, filler sections in said sheath and contributing with it to form an insert receiving, longitudinal bore, a follower in said bore having spring controlled prongs to engage the filler sections, means coöperating with said sections to permit their relative movement and to fix one section with respect to said sheath, and an end cap connected to one of said sections to move it to effect the feed of said follower.

8. In a pencil, in combination, a sheath, filler sections within said sheath and contributing with it to form an insert receiving, longitudinal bore, said sections having grooves, the groove in one section being wider than the groove in the other section, a split ring in said groove to interlock with said sheath, an end member connected with one of said sections to move it, and a follower in said bore and actuated by one of said sections.

9. In a pencil, in combination, a sheath, filler sections in said sheath and contributing with it to form an insert receiving, longitudinal bore, means to fix one of said sections with respect to said sheath and permit limited relative movement of said sections, a follower controlled by one of said sections to feed the insert, an end cap into which said sections extend, and means coöperating with said sections and end cap to permit relative movement of said sections and to fix one filler section with respect to said end cap.

FISHER H. LIPPINCOTT.

Witnesses:
H. S. FAIRBANKS,
C. D. McVAY.